April 22, 1969 F. X. MAIDA 3,439,396
FEED THROUGH CAPACITOR RING
Filed May 18, 1966
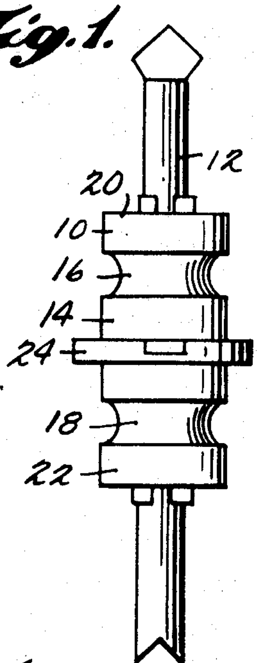
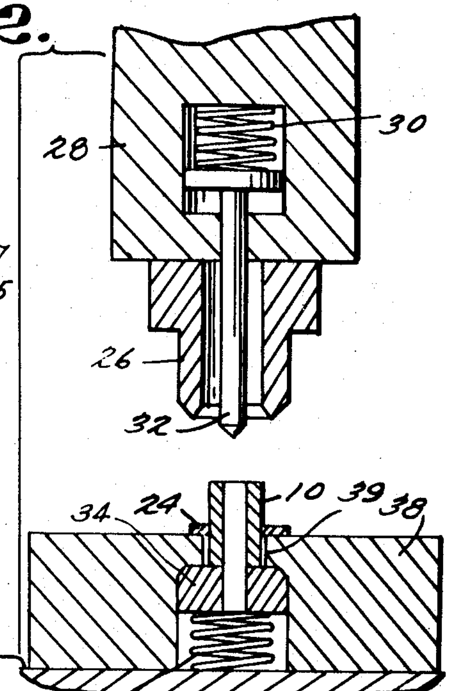
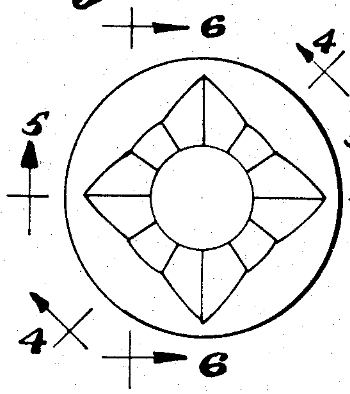
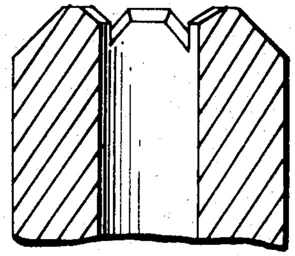
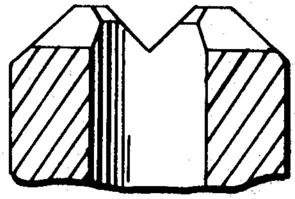
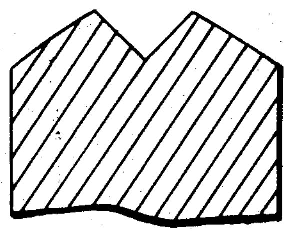
INVENTOR.
FRANCIS X. MAIDA
BY
Cushman, Darby & Cushman
ATTORNEYS United States Patent Office 3,439,396

Patented Apr. 22, 1969

3,439,396

FEED THROUGH CAPACITOR RING

Francis X. Maida, Hampton, Va., assignor to Maida Development Company, Hampton, Va., a corporation of New Jersey Filed May 18, 1966, Ser. No. 551,138
Int. Cl. H01g 13/00
U.S. Cl. 29—25.42 8 Claims

ABSTRACT OF THE DISCLOSURE

A method of mounting a conductive ring or flange around a central portion of a feed through capacitor is disclosed. The ring is positioned around the center portion of a ceramic tube, whereupon the ring is deformed or crimped into contact with the tube in order to grip it. The ring is then soldered to the tube for the purpose of ensuring an adequate electrical connection. The feed through capacitor is thus capable of being passed through an opening in a metal shield or partition and mounted thereon by virtue of the ring.

This invention relates in general to an improved method of manufacturing a "feed through" capacitor and in particular, this invention relates to an improved method of mounting a ring or flange around the outside of a "feed through" capacitor.

A feed through capacitor derives its name from the fact that while performing the function of a capacitor, it also serves as a means of passing a conductor through a metal partition. The capacitor is assembled from three basic components: a central or inner conductor which extends from end to end of the capacitor with various types of terminations, a dielectric which insulates the central conductor from the partition, and an outside conductor which makes contact with the partition and affords some method of mounting the unit. The inner conductor and the outer conductor separated by the dielectric form a capacitor. The partitions in which these are mounted are usually metal shields surrounding some electronic circuit. The function of the feed through capacitors is to provide paths for signals, power, etc., to the circuits within the enclosure. Mounted in holes drilled in the enclosure, it is clear that the rigid units provide convenience in assembly of the finished device incorporating these circuits. Since the capacity of a feed through capacitor is fixed, there is a minimum variation in the capacity in the circuit incorporating the conductor passing through the capacitor. There are many other reasons for using feed through capacitor such as good insulating properties.

Some prior art methods for manufacturing feed through capacitors will now be discussed.

The type of feed through capacitors discussed is of one specific type; however, other types do exist. The inner conductor consists of a pin made of metal with varying degrees of size. The end terminations of this pin or lead may take any desirable shape such as a hook, swage, loop or notched lug and often times a plain stiff wire. This inner conductor is passed through the center hole of a ceramic tube. The tube is metallized on the inside and ends as well as the central portion of the outside. Separating these two metallized areas are two insulating bands, these consisting of bare ceramic on the outer surface or grooves ground into the outer surface of the ceramic. The inner conductor is connected to the inside metallized area by some means such as soldering. Placed on the metallized central portion on the outside of the tube is some type of flange for mounting the feed through capacitor in the hole in the partition. Bushings, eyelets, rings or other devices designed to provide a flange are currently used. Soldering is usually incorporated to secure a good electrical connection between the flange and the metallized area on the tube. In all of the prior art approaches, the flange is applied and held in place by some springing action whereby the eyelet is forced on. For instance, a ring is sometimes made with a split so that when placed on the tube the ring has to be spread slightly.

The main drawback of the prior art approaches results from the fact the flange is forced onto the ceramic tube and held in place by some spring action inherent in the metal used to form the flange. A force-fitted metal flange may leave a metal track as it slides across the insulating area on the outside of the tube, this track, of course, defeating the purpose of the insulating band. Further, a force-fitted flange increases the danger of damaging the tube because some stresses existing along the radius towards the center of the tube are not balanced by stresses of equal values on the opposite side of the tube. Also, other unbalanced stresses may exist in the tube when a force-fitted flange is employed.

Thus, it is an object of this invention to prevent the formation of metal tracks on the insulating bands of a feed through capacitor.

It is another object of this invention to provide an improved method of mounting a flange around the outside of a feed through capacitor whereby all stresses developed therein are of equal value and radially directed, thereby cancelling each other out.

Other objects and advantages of this invention will become apparent upon reading the appended claims in conjunction with the following detailed description and the attached drawings, in which:

FIGURE 1 is a top view of a feed through capacitor with flange mounted thereon;

FIGURE 1A is an end view of the capacitor shown in FIGURE 1;

FIGURE 2 is a cross-sectional side view of illustrative apparatus for practicing this invention;

FIGURE 3 is a detailed bottom view of a die tip included in the apparatus shown in FIGURE 2; and FIGURES 4–6 are cross-sectional views of the die tip shown in FIGURE 3 respectively taken on the lines 4—4, 5—5, and 6—6.

Referring to FIGURES 1 and 1A, there is shown a tube 10 which has a central or inner conductor 12 which passes through a hole 13, preferably located at the center of the tube. The inside surface (not shown) of the hole through tube 10 is metallized. The central portion 14 of the outside surface of tube 10 is also metallized. The tube 10 is preferably made from some type of ceramic material. In the embodiment shown in FIGURE 1, grooves 16 and 18 are provided in tube 10 to respectively insulate metallized portion 14 from the ends 20 and 22 of the tube 10. Thus, a capacitor is effectively provided between the central portion of the outside surface and the inner conductor, as described before.

Flange or ring 24 is mounted onto the central portion 14. The main feature of ring 24 is the fact that it is not forced over the ceramic tube 10. In the assembly operation, the ring, which has an inside diameter larger than the outside diameter of the ceramic tube, is held in position in the center of the tube by the assembly machine. While in this position, the machine strikes the ring in such a way that by slightly deforming the ring, it grips the tube and remains in place. Soldering is preferably employed to complete the operation. In FIGURE 1A, there is shown an end view of the capacitor and the flange 24. Shown on the flange are illustrative forming marks 25 and deformations 27, the deformations gripping the tube 10.

There are two significant advantages to this method of mounting a flange on a feed through capacitor. First, without the necessity of forcing the ring over the tube, the danger of tracking across the insulating bands is eliminated. A force fitted metal eyelet or ring may leave a metal track as it slides across the insulating band, this conducting track of course defeats the purpose of the insulating band with various degrees of failure following. The second advantage is that the danger of damaging the ceramic tube is much less in the method using the ring crimped into place rather than the force-fit type. In the new method, any stress that exists is along the radius towards the center of the tube with the stress on opposing sides being equal. Thus cracking along longitudinal axis and chipping are eliminated. Further, the size of the tubes and rings are not as critical. The relative size of the ring and tube in a force-fit operation are by necessity critical to insure a tight fit but not tight enough to damage the tube. Because of the subject invention, the ring assumes the shape of the tube when it is crimped, thus yielding a more uniform product without the danger of having flanges loosen during later processes.

For a description of the method and apparatus for practicing the method, reference will be made to FIGURE 2, which shows a simplified cross-section of the machine and FIGURE 3 which shows a detail of a die tip 26 which strikes the ring 24. Machine member 28 holds the die tip 26 and it is connected to a punch press (not shown) which imparts a vertical motion to the member 28. Spring 30 biases a centering pin 32 downwardly as low as possible. Pin 32 is free to move in the vertical direction within the member 28. The ceramic tube 10 upon which the metal ring will be swaged into place is shown below the centering pin 32.

Piston 34 is movable in a vertical direction and supports the ceramic tube 10 during the swaging operation. Spring 36 supports member 34, spring 36 being substantially stronger than spring 30. Machine member 38 holds the ceramic tube 10 in hole 39, the ring 24 resting upon member 38 during swaging. Machine base 40 firmly supports member 38.

During the swaging operation, ceramic tube 10 is placed into hole 39 in machine piece 38 and is supported by piston 34. A metal ring 24 slightly larger than the ceramic tube is placed over the tube. The machine is so designed that tube 10 will be in such a position as to cause ring 24 to reside in correct vertical position relative to the ceramic tube, that is, at the central portion thereof.

The punch press imparts a downward vertical motion to the upper member 28. Pin 32 engages the hole in the ceramic tube 10 and centers it in respect to the die 26. Since spring 30 is weaker than the bottom spring 36, the pin will be displaced upward into member 28, the resultant tension holding the tube firmly in position. The die 26 proceeds downward over tube and strikes the ring 24. By virtue of the shape of the die (see FIGURES 3–6), the ring 24 is deformed in such a manner so as to grip the ceramic tube 10. When upper member 28 is raised, air may be utilized to remove ring and tube from machine in anticipation of next tube and ring to be assembled. Spring 36 is used primarily as a shock relief during the centering operation and also to insure proper location of ceramic tube.

The entrie machine may have a number of members 38 arranged in a circle on a revolving table or base (not shown). The placing of the ceramic tube and ring and the removal is accomplished when the particular member is not in position under the die. As the table rotates and stops in a stepping motion, each member comes into position, the ring is swaged and the member moves on to be emptied and refilled with a new tube and ring.

Still numerous other modifications of the invention will become apparent to one of ordinary skill in the art upon reading the foregoing disclosure. During such a reading, it will be evident that this invention has provided a unique method for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims.

What is claimed is:

1. The method of securing an electrically conductive ring around the central portion of a cylindrical feed through capacitor, said ring having an inside diameter larger than the outside diameter of said capacitor, said method comprising the steps of:

holding said ring in position where it encircles the outside said central portion; and deforming said ring so that it engages said central portion.

2. The method as in claim 1 where said ring is deformed by striking said ring so that it is swaged onto the said cylinder.

3. The method as in claim 2 where said striking is equally applied around the periphery of said ring thereby introducing substantially only radially directed, equal valued stresses in said tube which tend to cancel each other out.

4. The method as in claim 1 where said ring is soldered to said cylinder after said deformation takes place.

5. The method of assembling a feed through capacitor comprising the steps of:

placing a tube made of dielectric material in a first position, said tube having an electrically conductive material on the outside surface of the central portion, an electrically conductive material along the inside surface thereof, and an electrically resistive portion on the outside surface thereof separating the electrically conducting materials on the respective outside and inside surfaces to thereby establish the capacitor aspect of the feed through capacitor;

holding a ring around said central portion, said ring having an inside diameter larger than the outside diameter of said tube; and deforming said ring so that it engages said central portion.

6. The method as in claim 5 where said ring is deformed by striking said ring so that it is swaged onto the said cylinder.

7. The method as in claim 6 where said striking is equally applied around the periphery of said ring, thereby introducing substantially only radially directed, equal valued stresses in said tube which tend to cancel out each other.

8. The method as in claim 5 where said ring is soldered to said central portion after said deformation takes place.

References Cited

UNITED STATES PATENTS 3,250,969 5/1966 Fanning ------- 29—25.42 XR

FOREIGN PATENTS 913,810 12/1962 Great Britain.

JOHN F. CAMPBELL, *Primary Examiner.*

R. B. LAZARUS, *Assistant Examiner.*

U.S. Cl. X.R.

317—242